United States Patent
Fremau et al.

(10) Patent No.: US 9,410,601 B2
(45) Date of Patent: Aug. 9, 2016

(54) HYBRID TRANSMISSION FOR A MOTOR VEHICLE, AND CONTROL METHOD

(75) Inventors: Nicolas Fremau, Saint Ramy les Chevreuse (FR); Antoine Vignon, Igny (FR); Sid-Ali Randi, Chambery (FR); Ahmed Ketfi-Cherif, Elancourl (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 335 days.

(21) Appl. No.: 14/009,223

(22) PCT Filed: Mar. 29, 2012

(86) PCT No.: PCT/FR2012/050661
§ 371 (c)(1),
(2), (4) Date: Feb. 28, 2014

(87) PCT Pub. No.: WO2012/131259
PCT Pub. Date: Oct. 4, 2012

(65) Prior Publication Data
US 2014/0165780 A1 Jun. 19, 2014

(30) Foreign Application Priority Data
Apr. 1, 2011 (FR) ...................................... 11 52805

(51) Int. Cl.
*F16H 3/08* (2006.01)
*F16H 3/02* (2006.01)
(Continued)

(52) U.S. Cl.
CPC *F16H 3/02* (2013.01); *B60K 6/442* (2013.01); *B60K 6/48* (2013.01); *B60K 6/547* (2013.01);
(Continued)

(58) Field of Classification Search
CPC . Y10T 477/27; F16H 3/08; F16H 2003/0815; F16H 2003/0818; F16H 2003/0933; B60K 6/442; B60K 6/547; B60K 2006/4822; B60W 10/113; B60W 10/06; B60W 10/08; B60W 2710/1005; B60W 2520/10
USPC .............................. 74/329, 330; 475/5; 477/5
See application file for complete search history.

(56) References Cited

U.S. PATENT DOCUMENTS

| 7,979,704 | B2 * | 7/2011 | Tsuboka | G06F 21/445 |
| | | | | 380/44 |
| 8,585,522 | B2 * | 11/2013 | Kaltenbach | B60W 10/06 |
| | | | | 475/218 |

(Continued)

FOREIGN PATENT DOCUMENTS

| DE | 10 2006 003725 | 8/2007 |
| EP | 1 013 494 | 6/2000 |

(Continued)

OTHER PUBLICATIONS

U.S. Appl. No. 14/354,435, filed Apr. 25, 2014, Fremau, et al.

(Continued)

*Primary Examiner* — Roger Pang
(74) *Attorney, Agent, or Firm* — Oblon, McClelland, Maier & Neustadt, L.L.P.

(57) ABSTRACT

A hybrid transmission for a motor vehicle including a heat engine and a driving electrical machine, including two concentric primary shafts, each of which includes at least one intermediate drive on a secondary shaft connected to wheels of the vehicle. The transmission includes a first mechanism for coupling the two primary shafts together, and capable of assuming at least three positions, of positions in which: the heat engine is separated from the drive train connecting the electrical machine to the wheels; the heat engine drives the wheels with or without the assistance of the electrical machine; and the heat engine and the electrical machine are coupled together to add respective torques thereof to the wheels.

12 Claims, 9 Drawing Sheets

(51) Int. Cl.
*B60K 6/48* (2007.10)
*B60K 6/547* (2007.10)
*B60W 10/06* (2006.01)
*B60W 10/08* (2006.01)
*B60W 10/11* (2012.01)
*B60W 10/113* (2012.01)
*B60K 6/442* (2007.10)
*B60K 35/00* (2006.01)

(52) U.S. Cl.
CPC ............... *B60W 10/06* (2013.01); *B60W 10/08* (2013.01); *B60W 10/11* (2013.01); *B60W 10/113* (2013.01); *B60W 20/11* (2016.01); *B60K 35/00* (2013.01); *B60K 2006/4825* (2013.01); *B60K 2350/1092* (2013.01); *B60W 2520/10* (2013.01); *B60W 2710/1005* (2013.01); *B60Y 2400/421* (2013.01); *B60Y 2400/607* (2013.01); *Y02T 10/6221* (2013.01); *Y02T 10/6252* (2013.01); *Y02T 10/6286* (2013.01); *Y10S 903/909* (2013.01); *Y10T 74/19051* (2015.01)

(56) References Cited

U.S. PATENT DOCUMENTS

| | | | | |
|---|---|---|---|---|
| 2010/0120580 | A1* | 5/2010 | Mepham | B60K 6/36 477/3 |
| 2010/0292047 | A1 | 11/2010 | Saito | |
| 2011/0073393 | A1 | 3/2011 | Sasaki | |
| 2012/0010035 | A1* | 1/2012 | Hemphill | B60K 6/26 475/5 |
| 2012/0065016 | A1* | 3/2012 | Tamai | F16H 3/728 475/5 |
| 2014/0290592 | A1* | 10/2014 | Vignon | B60K 6/48 123/2 |
| 2014/0315681 | A1* | 10/2014 | Fremau | B60K 6/48 477/5 |
| 2015/0291154 | A1* | 10/2015 | Kaltenbach | B60K 6/48 477/5 |

FOREIGN PATENT DOCUMENTS

| | | | | |
|---|---|---|---|---|
| EP | 2 281 727 | | 2/2011 | |
| FR | 2 811 395 | | 1/2002 | |
| FR | 2966786 | A3 * | 5/2012 | ............... B60K 6/36 |
| WO | 2009 109821 | | 9/2009 | |

OTHER PUBLICATIONS

International Search Report Issued May 31, 2012 in PCT/FR12/050661 Filed Mar. 29, 2012.

French Search Report Issued Oct. 10, 2011 in French Patent Application No. 11 52805 Filed Apr. 1, 2011.

* cited by examiner

HYBRID TRANSMISSION FOR A MOTOR VEHICLE, AND CONTROL METHOD

BACKGROUND

The present invention relates to the field of hybrid transmissions for motor vehicles comprising, on the one hand, a combustion engine for drive and, on the other hand, an electric machine.

More specifically it relates to a hybrid transmission for a motor vehicle equipped with a combustion engine and with an electric machine for drive, comprising two concentric primary shafts each bearing at least one gear for transmitting to a secondary shaft connected to the wheels of the vehicle.

Hybrid transmissions have the key benefit of offering the vehicle drivetrain two sources of power, combustion and electric, the torques supplied by which can be combined in what is known as a hybrid mode, or can be used separately, either in a "pure combustion mode" in which the electric machine supplies the drivetrain with no torque, or in a "purely electrical" mode in which the combustion engine provides the drivetrain with no torque. Other functionalities are also required, such as the possibility of starting the combustion engine from stationary or when moving, using the electric machine as a starter, or that of using the electric machine as a current generator in order to charge the batteries.

In its simplest design, a hybrid transmission as introduced hereinabove performs all the required functions on just one step-down gear ratio, i.e. without the option of enjoying several forward gears as are found in a conventional transmission.

Publication U.S. Pat. No. 5,433,282 discloses a hybrid transmission for a motor vehicle which is essentially made up of a simple epicyclic geartrain of which the three outputs, planet carrier, sun gear and annulus gear, are connected to the combustion engine, to the electric machine and to the wheels of the vehicle. The combustion engine, the electric machine and the geartrain are coaxial. A free wheel is positioned between the combustion engine and the sun gear of the gear train. It notably allows the contributions from the electric machine and from the electric machine to be combined for driving the vehicle and to have two transmission gear ratios. However, its ability to suit specific types of driving, such as typically urban driving and typically highway driving in pure electrical mode at modest speeds, and typically motorway driving at high speed, for example in pure combustion mode, are limited.

SUMMARY

The present invention seeks to make available a hybrid transmission that has at least two distinct gear ratios in electric and hybrid mode and a higher gear ratio dedicated to high-speed driving in combustion mode.

To this end, it provides a first means of coupling between two primary shafts able to occupy three positions in which:
  the combustion engine is uncoupled from the drivetrain that connects the electric machine to the wheels,
  the combustion engine drives the wheels independently of the electric machine,
  the combustion engine and the electric machine are coupled in such a way that their respective torques bound for the wheels are combined.

According to one particular embodiment, this transmission has two transmission gears transmitting from a hollow primary shaft to idler gears of a secondary shaft, and a second means of coupling one or other of these two idler gears to said secondary shaft.

For preference, use is made of the electric machine as the sole source of motive power up to a speed threshold at which the combustion engine is coupled to the wheels.

BRIEF DESCRIPTION OF THE DRAWINGS

Other features and advantages of the invention will become clearly apparent from reading the following description of one nonlimiting embodiment thereof, with reference to the attached drawings in which.

DETAILED DESCRIPTION

Figure 1:
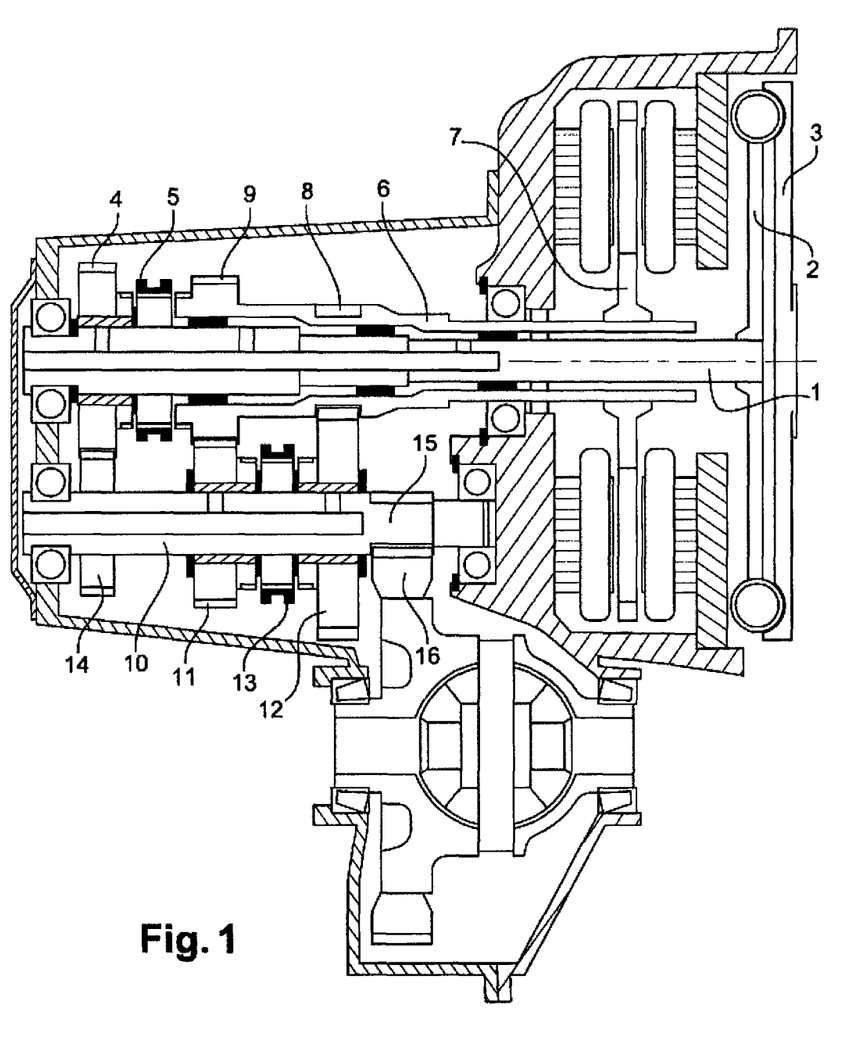
FIG. 1 is a diagram of a design of the proposed transmission.

The transmission illustrated in the figures comprises a solid primary shaft 1 connected directly via a filtering system (damping hub, "damper", double flywheel or the like) 2, to the flywheel 3 of a combustion engine (not depicted). The solid shaft 1 bears an idler gear 4 that can be connected to it by a first coupling system 5 (dog clutch, synchromesh or any type of progressive or non-progressive coupler). A hollow primary shaft 6 is connected to the rotor of an electric machine 7, preferably (although this is not compulsory) of the discoid axial type of machine. Other types of electric machine can also be used in the context of the invention, for example radial machines, machines with an excitation coil or a magnet, or reluctance type machines. The hollow shaft 6 bears two fixed gears 8, 9. The hollow shaft 6 can be connected to the solid primary shaft 1 by the coupling system 5. A secondary shaft 10 bears two idler gears 11 and 12. The idler gears 11, 12 can be connected to the primary shaft by a second coupling system 13 (dog clutch, synchromesh, or some other type of progressive or non-progressive coupler). The secondary shaft 10 also bears a fixed gear 14 and a transmission gear 15 transmitting to a differential 16 connected to the wheels (not depicted) of the vehicle.

The first coupling means 5 can occupy at least three positions in which:
  the combustion engine is uncoupled from the drivetrain that connects the electric machine 7 to the wheels (position 1),
  the combustion engine drives the wheels with or without top-up from the electric machine (position 2), and
  the combustion engine and the electric machine are coupled in such a way that their respective torques bound for the wheels are combined (position 3).

Figure 2:
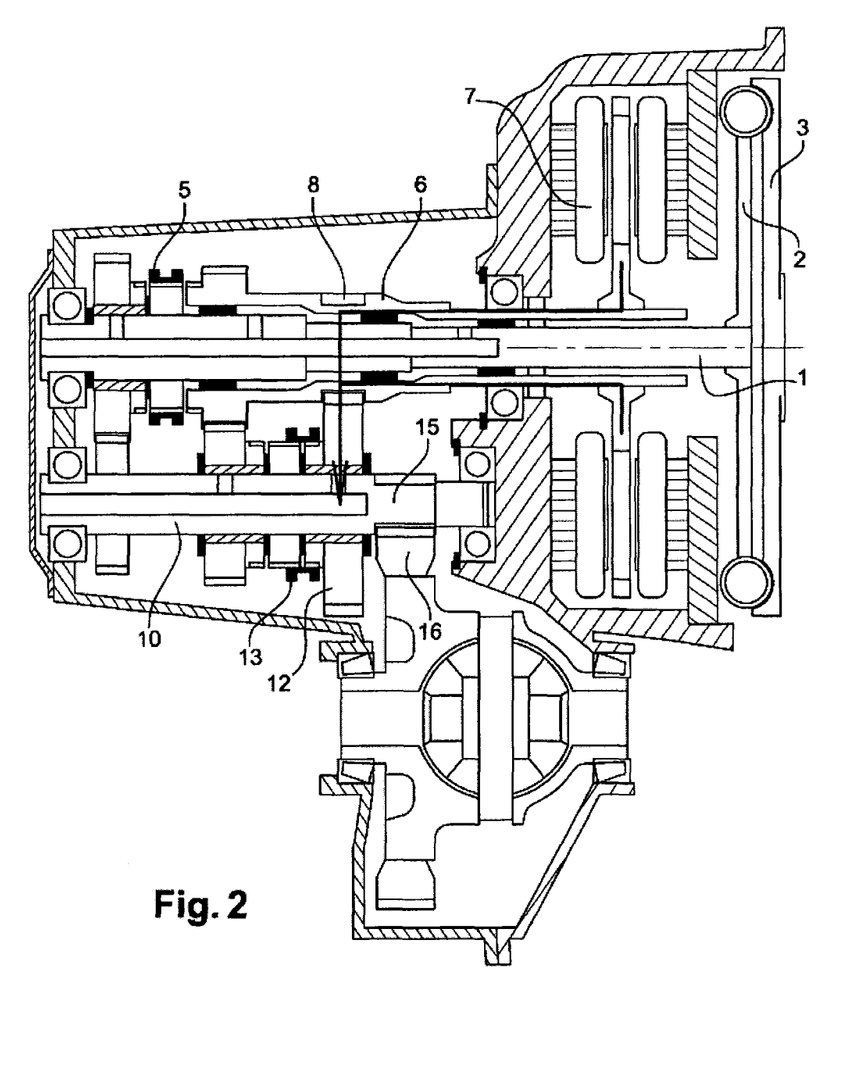
FIG. 2 illustrates starting and driving in electric mode on the short gear ratio.

In FIG. 2, the first coupling system 5 is open (position 1), while the second coupling system 13 is closed in order to connect the idler gear of the short gear ratio 12 to the secondary shaft 10. The transmission is in electric mode on the short gear ratio, or first forward gear ratio. The torque supplied by the electric machine to the hollow primary shaft 6 flows via the first fixed gear 8 to the idler gear 12. The coupling system 13 rotationally connects the gear 12 and the shaft 10. The torque flows from the secondary line to the differential 16 via the gear 15.

Figure 3:
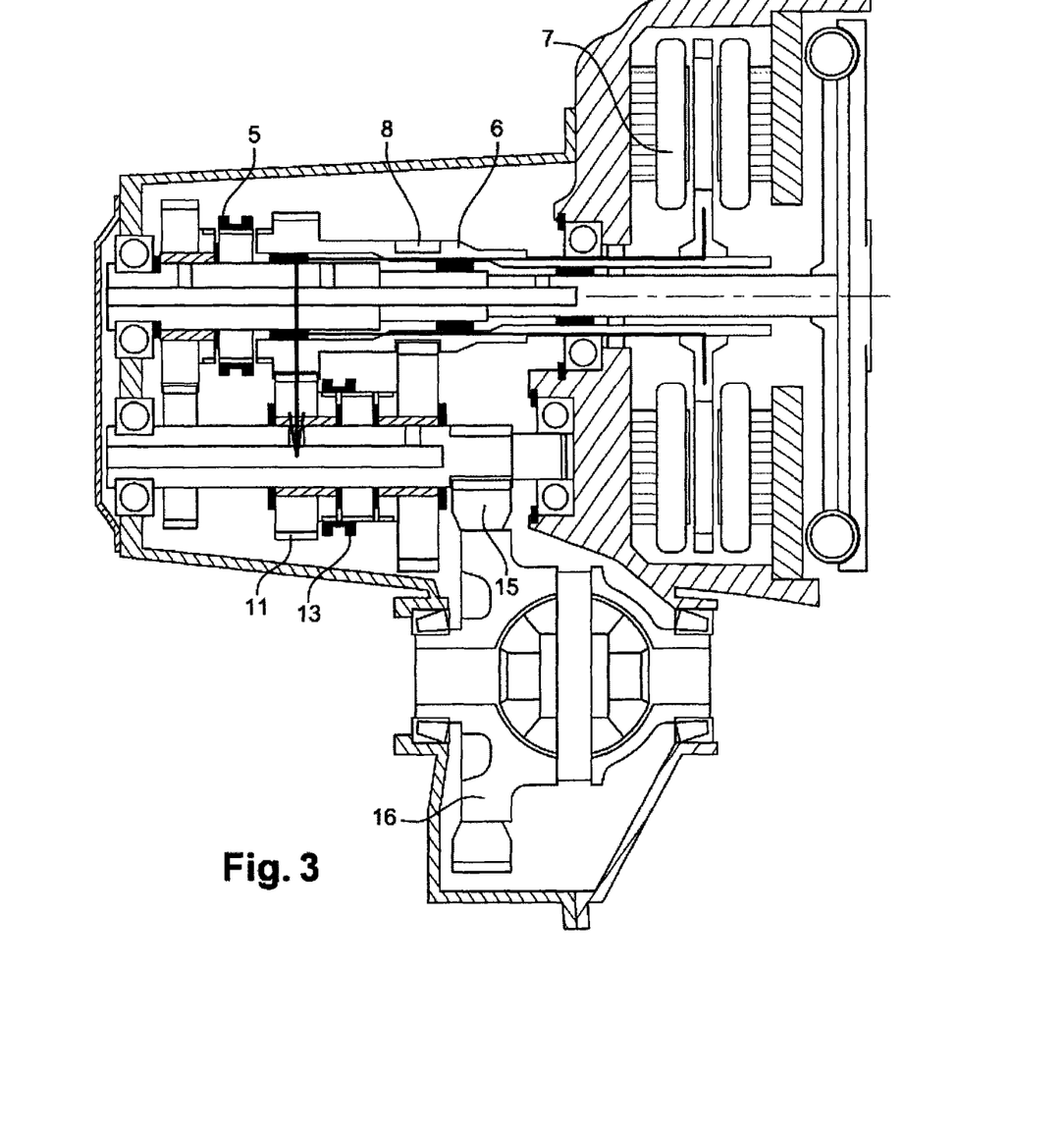
FIG. 3 illustrates driving in electric mode on an intermediate gear ratio.

In FIG. 3, the first coupling system 5 is still open (position 1) whereas the second coupling system 13 is closed in order to connect the idler gear of the intermediate gear ratio 11 to the secondary shaft 10. The transmission is in electric mode on the intermediate gear ratio, or second forward gear ratio. The torque supplied by the electric machine 7 to the hollow primary shaft 6 flows via the second fixed gear 9 to the idler gear 114. The coupling system 13 rotationally connects the gear 11 and the shaft 10. The torque flows from the secondary line to the differential 16 via the gear 15.

Figure 4:
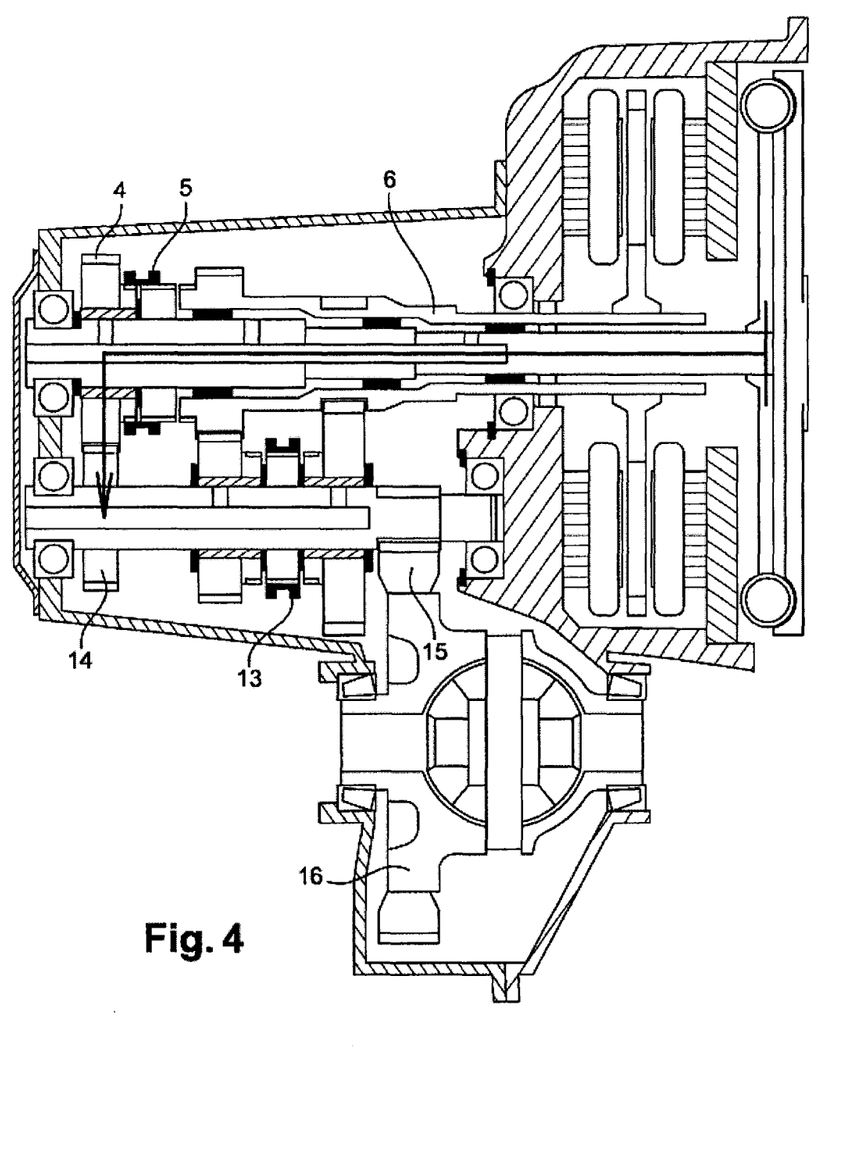
FIG. 4 illustrates driving in combustion mode on the long gear ratio.

In FIG. 4, the first coupling system 5 is closed in position 2, so as to connect the idler gear 4 borne by the solid shaft 1 to that shaft, whereas the second coupling means 13 is open. Transmission is on the long, or third, gear ratio. The electric machine supplies no torque. The torque supplied by the combustion engine flows to the secondary shaft 10 via the gear 4 and the fixed gear 14 of the secondary shaft 10. As before, the torque flows from the secondary line to the differential 16 via the gear 15.

Figure 5:
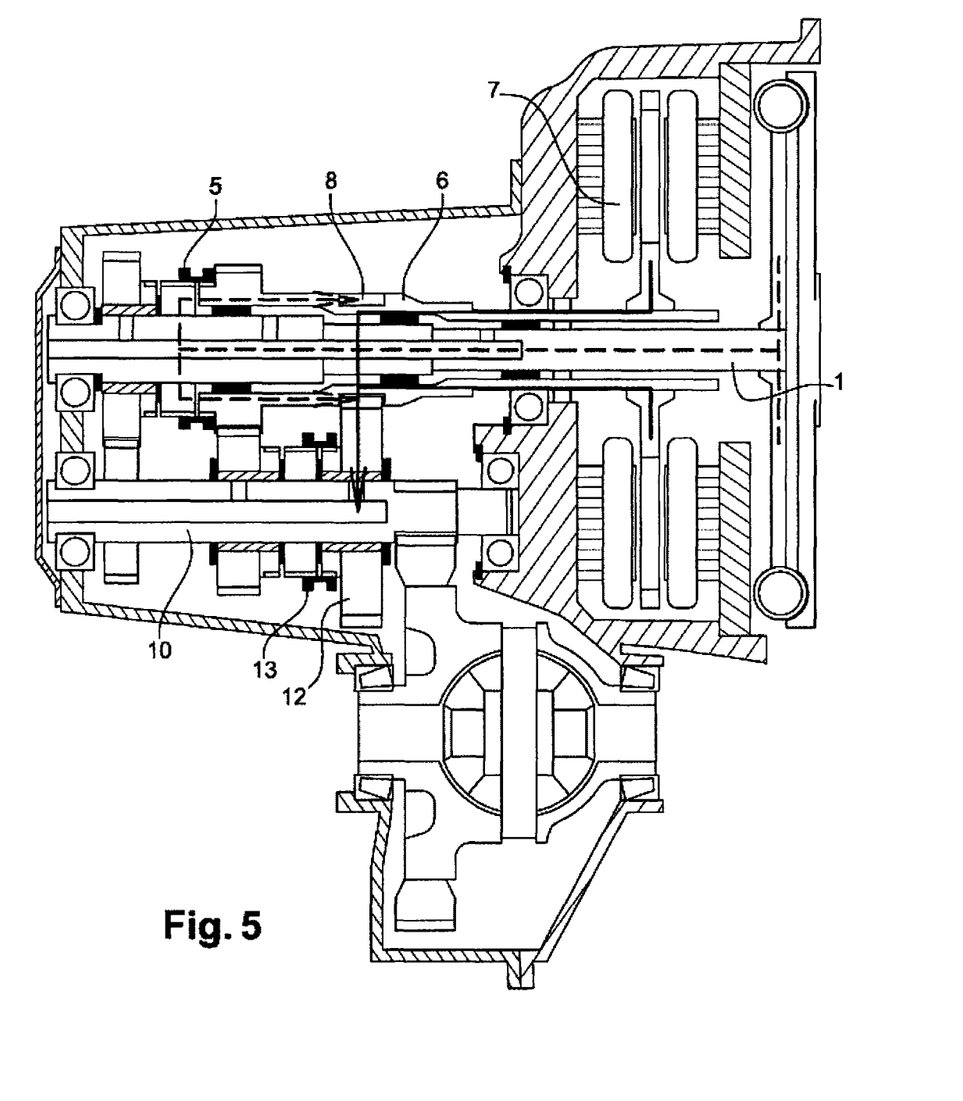
FIG. 5 illustrates driving in hybrid mode on the short gear ratio.

In FIG. 5, the first coupling means 5 is closed in position 3, so as to connect the solid shaft 1 to the hollow shaft 6. The second coupling system 13 is closed so as to connect the idler gear of the short gear ratio 12 to the secondary shaft 10. The transmission is in hybrid mode on the short gear ratio. The contributions from the combustion engine and from the electric machine to the drivetrain are combined. They are transmitted from the hollow primary shaft 6 to the secondary shaft by the train of gears 8, 12.

Figure 6:
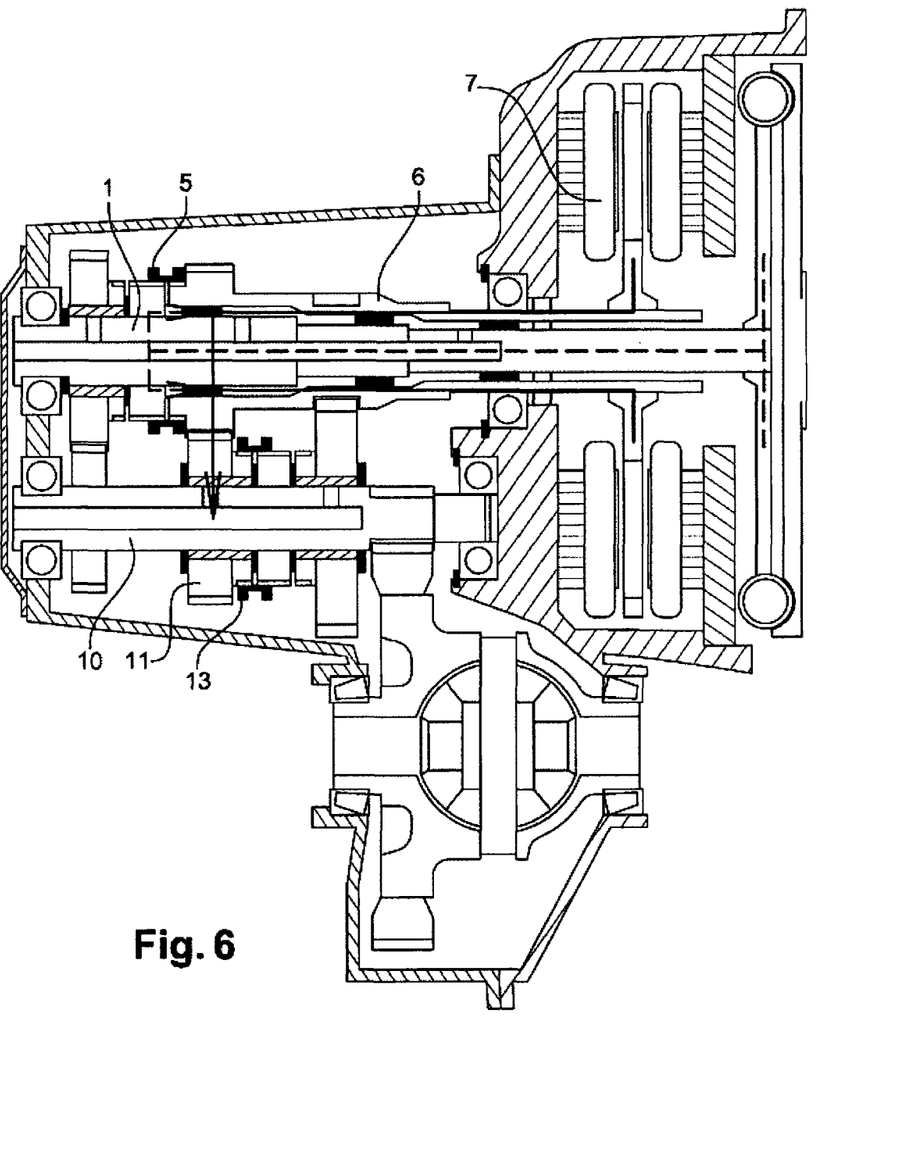
FIG. 6 illustrates driving in hybrid mode on the intermediate gear ratio.

In FIG. 6, the first coupling means 5 is still closed, in position 3, as in FIG. 5. The solid primary shaft 1 is therefore connected to the hollow primary shaft 6. The second coupling system 13 is also closed: the idler gear 11 of the intermediate gear ratio is connected to the secondary shaft 10. The transmission is in hybrid mode on the intermediate gear ratio. The contributions from the combustion engine and from the electric machine to the drivetrain are combined.

Figure 7:
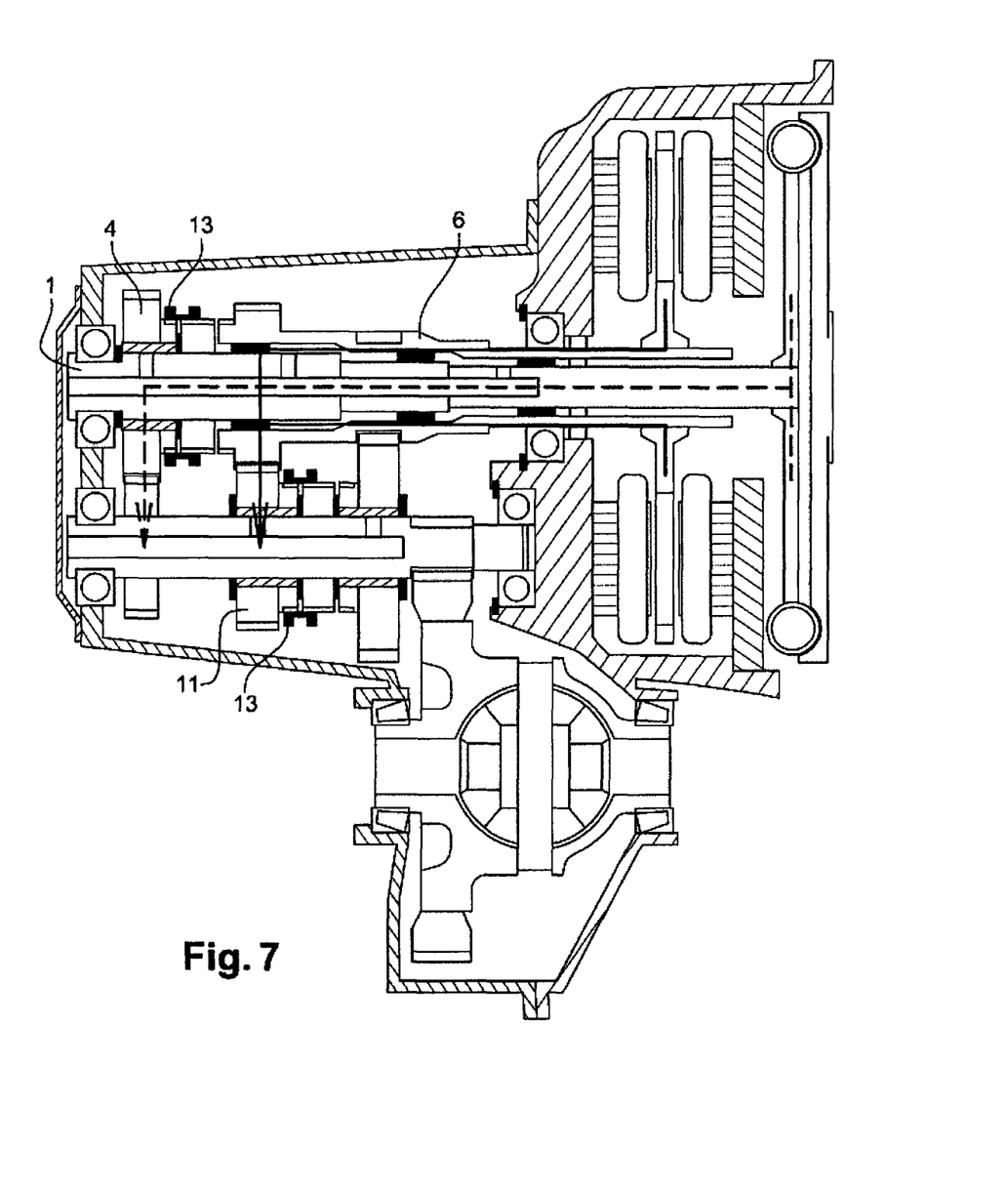
FIG. 7 illustrates the use of the combustion engine in hybrid mode on the long gear ratio with intervention of the electric machine on the intermediate gear ratio.

In FIG. 7, the first coupling system 5 is closed in position 2: it connects the idler gear 4 borne by the solid primary shaft 1 to that shaft. Moreover, the second coupling means 13 is closed so as to connect the idler gear 11 of the intermediate gear ratio to the secondary shaft 10. The transmission is in hybrid mode on the long gear ratio, with the contributions from the combustion engine and from the electric machine combined.

Figure 8:
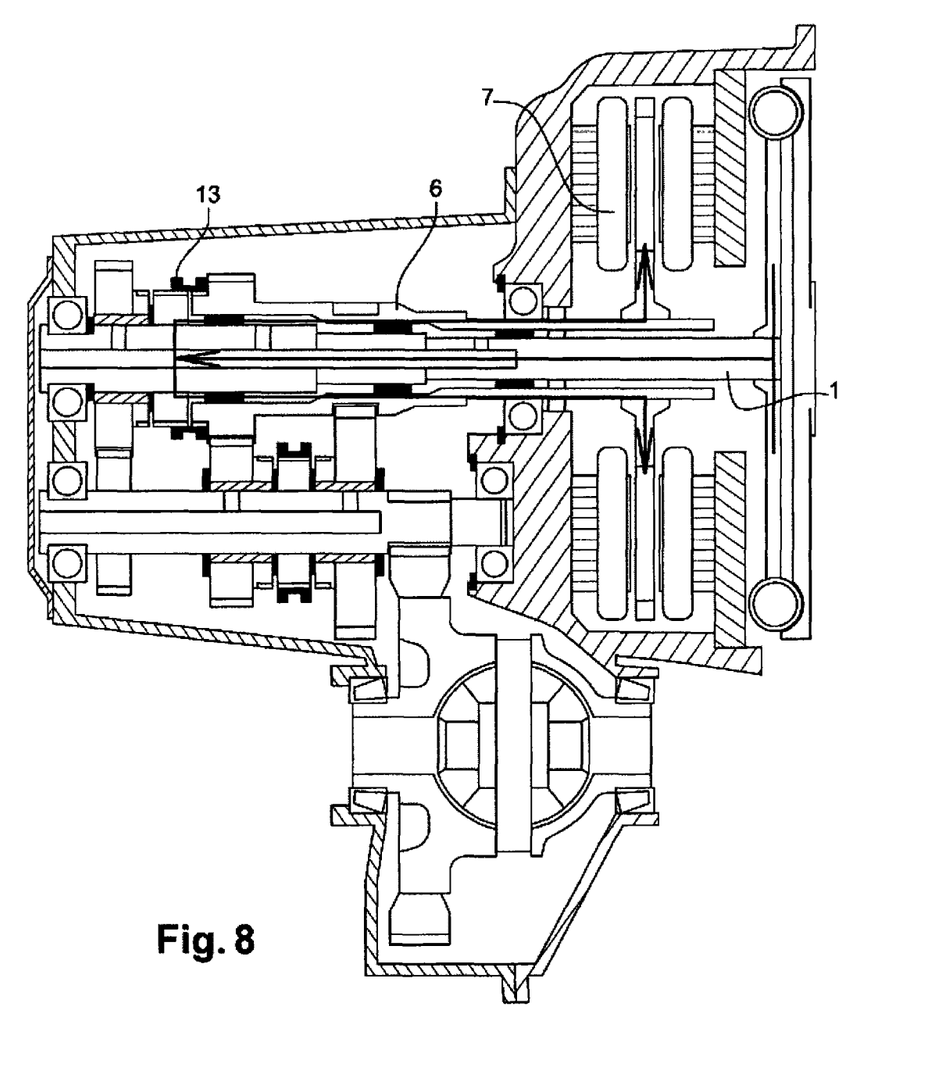
FIG. 8 illustrates the regenerating of the batteries of the vehicle in neutral.

In FIG. 8, the first coupling system is in position 3, as in as in FIGS. 5 and 6, i.e. it rotationally connects the solid primary shaft 1 and the hollow primary shaft 6. The second coupling system 13 is open. The transmission is therefore in "neutral". The combustion engine turning over can drive the electric machine which then operates as a generator to recharge the batteries (not depicted) of the vehicle.

The three positions of the first coupling means 5 and the combined intervention of the second coupling means 13 give the transmission at least the following modes:
  an electric mode on two gear ratios (the short gear ratio and the intermediate gear ratio) in position 1 (cf. FIGS. 2, 3),
  a combustion mode on one gear ratio (the long gear ratio) in position 2 (cf. FIG. 4),
  hybrid modes in which the torques are combined on the short gear ratio and on the intermediate gear ratio, in position 3 (cf. FIGS. 5 and 6),
  a hybrid mode on the long gear ratio in position 2 (cf. FIG. 7), and
  a battery regeneration mode in neutral in position 3 (cf. FIG. 8).

To sum up, the transmission has three gear ratios and the following modes: an electric mode on two gear ratios, a combustion mode on one gear ratio, a hybrid mode on three gear ratios and a regeneration mode in neutral.

The gear shifts may take place as follows between the second gear ratio in electric mode and the third gear ratio in combustion mode:
  the combustion engine is brought to its synchronous speed without being connected to the drivetrain (position 1),
  the combustion engine is coupled to the drivetrain (shifting of the first coupling means into position 2), and
  the electric machine is switched off and the second coupling means is opened.

The shift between the second gear ratio in hybrid mode to the third gear ratio in combustion mode may be effected by:
  switching off the combustion engine,
  uncoupling the combustion engine (shifting of the first coupling means from position 3 to position 1),
  synchronizing the uncoupled combustion engine with the third gear ratio,
  coupling the combustion engine (shifting of the first coupling means from position 1 into position 2),
  switching off the electric machine, and
  opening the second coupling means.

Figure 9:
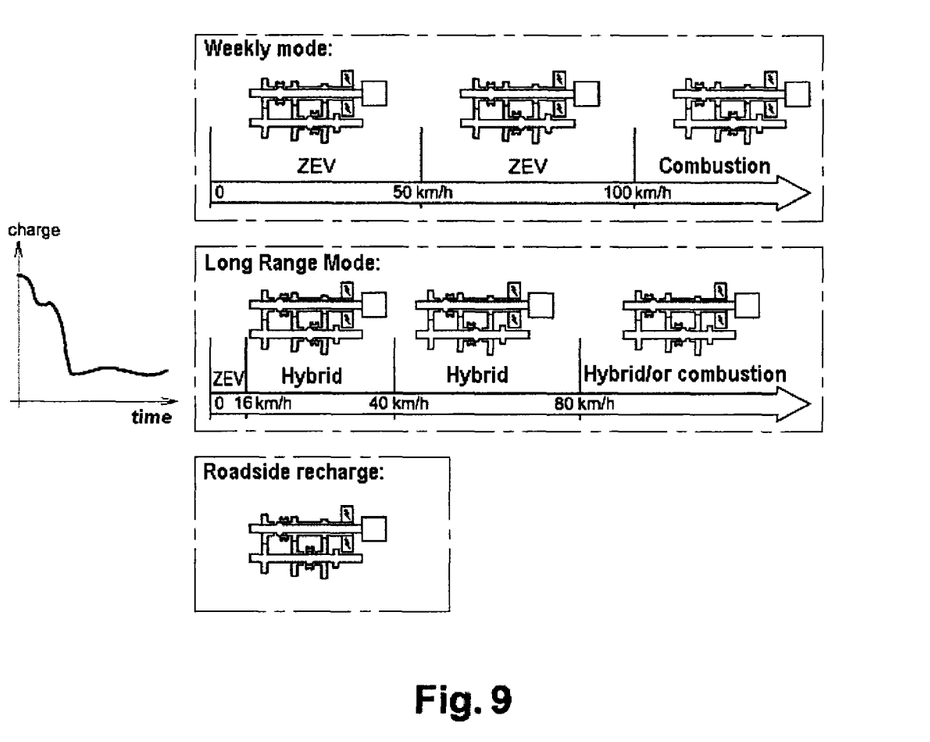
FIG. 9 illustrates an advantageous use of the transmission.

FIG. 9 illustrates one particularly advantageous but non-limiting use of the proposed transmission. In this example, the user has use of what is known as a "weekly" operation which maximizes purely electric use: the first electric gear ratio is activated for town driving up to around 50 km/h, at which speed the second electric gear ratio, corresponding to highway driving is passed. When the power demanded becomes great (for example at over 90 km/h), the combustion engine is started and takes over, with or without supplementary power being provided by the electric machine.

When the battery charge becomes low, or at the request of the user, the system can switch into an operating state referred to as "extended range" or "long range" operation. In this mode, after an electric start, the combustion engine is connected as soon as the speed permits this (at 1500 revolutions per minute, for example at 16 km/h). The first two gear ratios then become hybrid ones, and the electric machine is used essentially for regeneration. These two "town" and "highway" hybrid modes are supplemented by use of the combustion engine on a motorway. The changes in ratio are smaller, in order to minimize the noise from the combustion engine which is connected with the high rotational speed (increase to 3600 revolutions/minute for example). Finally, the "road side recharge" can be activated if the vehicle is parked for a lengthy period of time in order to recharge the battery.

In conclusion, the proposed transmission offers numerous possible modes of operation. In particular, use may be made of the three gear ratios by using the electric machine as the sole source of motive power on a short gear ratio, suited to town driving and an intermediate gear ratio suited to highway driving. Above a threshold, it is possible to shift to the long gear ratio suited to motorway driving, in which the combustion engine is coupled to the wheels (combustion mode). The electric machine can be used as an electric power generator to recharge the batteries of the vehicle in combustion mode.

Another way of putting the transmission to good use may be to use the electric machine as the sole source of motive power up to a second speed threshold, above which the motive power of the electric machine and that of the electric machine are combined in hybrid mode.

The electric machine may also intervene in synchronizing the transmission during the temporary uncoupling of the combustion engine that occurs during changes between the first and second gear ratios in hybrid mode.

Finally, from combustion mode on the long gear ratio, the electric machine can be coupled to the transmission either as a top-up source of motive power from the combustion mode or as a generator in the combustion mode.

The invention claimed is:

1. A method of controlling a hybrid transmission for a motor vehicle including a combustion engine and an electric machine for drive, the hybrid transmission comprising:
   two concentric primary shafts each bearing at least one gear for transmitting to a secondary shaft connected to wheels of the vehicle;
   a first coupling means between the two primary shafts configured to occupy at least three positions of:
      a first position in which the combustion engine is uncoupled from a drivetrain that connects the electric machine to the wheels,
      a second position in which the combustion engine drives eels with or without top-up from the electric machine, and
      a third position in which the combustion engine and the electric machine are coupled such that their respective torques bound for the wheels are combined,
   wherein a shift from a second gear ratio in an electric mode to a third gear ratio in a combustion mode comprises:
   bringing the combustion engine to its synchronous speed without being connected to the drivetrain as in the first position,
   coupling the combustion engine to the drivetrain by shifting the first coupling means into the second position, and
   switching the electric machine off and opening a second coupling means.

2. The control method as claimed in claim 1, wherein the electric machine is coupled to the transmission as a source of motive power from a thermal mode.

3. The control method as claimed in claim 1, wherein the electric machine as a generator is coupled to a thermal mode.

4. A method of controlling the hybrid transmission as claimed in claim 1, wherein the electric machine is used as a sole source of motive power up to a speed threshold at which the combustion engine is coupled to the wheels.

5. The control method as claimed in claim 1, wherein the electric machine is used as the sole source of motive power up to a speed threshold beyond which it becomes an electric power generator for recharging batteries of the vehicle.

6. The control method as claimed in claim 5, wherein the electric machine can operate as a source of motive power to synchronize the hybrid transmission during temporary uncoupling of the combustion engine including changes between a first and the second gear ratios.

7. The control method as claimed in claim 1, wherein the electric machine is used as a sole source of motive power up to a speed threshold beyond which the motive power of the electric machine and that of the combustion engine are combined.

8. The control method as claimed n claim 1, wherein the combustion engine is connected to one of the two concentric primary shafts, which is a solid primary shaft and the electric machine is connected to the other of the two concentric primary shafts, which is a hollow primary shaft.

9. The control method as claimed in claim 8, comprising two transmission gears transmitting from the hollow primary shaft to idler gears of the secondary shaft,
   wherein the second coupling means couples one or other of the idler gears of the secondary shaft to the secondary shaft.

10. The control method as claimed in claim 9, wherein the three positions of the first coupling means combined with an intervention of the second coupling means provides:
   an electric mode in the first position,
   a combustion mode in the second position, and
   hybrid modes in which the torques are combined, in the second and third positions.

11. The control method as claimed in claim 1, comprising an electric mode on a first and the second gear ratios, a combustion mode on one gear ratio, a hybrid mode on three gear ratios.

12. A method of controlling a hybrid transmission for a motor vehicle including a combustion engine and an electric machine for drive, the hybrid transmission comprising:
   two concentric primary shafts each bearing at least one gear for transmitting to a secondary shaft connected to wheels of the vehicle;
   a first coupling means between the two primary shafts configured to occupy at least three positions of:
      a first position in which the combustion engine is uncoupled from a drivetrain that connects the electric machine to the wheels,
      a second position in which the combustion engine drives the wheels with or without top-up from the electric machine, and
      a third position in which the combustion engine and the electric machine are coupled such that their respective torques bound for the wheels are combined,
   wherein a shift from a second gear ratio in hybrid mode to a third gear ratio in a combustion mode comprises:
   switching off the combustion engine,
   uncoupling the combustion engine by shifting the first coupling means from the third position to the first position,
   synchronizing the uncoupled combustion engine with the third gear ratio,
   coupling the combustion engine by shifting the first coupling means from the first position into the second position,
   switching off the electric machine, and
   opening a second coupling means.

* * * * *